(12) United States Patent
Bassali et al.

(10) Patent No.: US 8,347,327 B2
(45) Date of Patent: Jan. 1, 2013

(54) DYNAMIC ADVERTISEMENT INSERTION METHODS AND SYSTEMS

(75) Inventors: Harpal S. Bassali, San Francisco, CA (US); Armando P. Stettner, Westford, MA (US); Michael P. Ruffini, Methuen, MA (US); Marcelo D. Lechner, Burlington, MA (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 429 days.

(21) Appl. No.: 12/772,483

(22) Filed: May 3, 2010

(65) Prior Publication Data

US 2011/0191798 A1    Aug. 4, 2011

Related U.S. Application Data

(60) Provisional application No. 61/300,745, filed on Feb. 2, 2010.

(51) Int. Cl.
*H04N 7/025* (2006.01)
*H04N 7/10* (2006.01)

(52) U.S. Cl. ............................ 725/32; 725/36
(58) Field of Classification Search ............... 725/32, 725/36
See application file for complete search history.

(56) References Cited

U.S. PATENT DOCUMENTS

| | | | |
|---|---|---|---|
| 6,297,853 B1 * | 10/2001 | Sharir et al. | 348/589 |
| 2007/0118425 A1 * | 5/2007 | Yruski et al. | 705/14 |
| 2007/0157231 A1 * | 7/2007 | Eldering et al. | 725/35 |
| 2008/0155588 A1 * | 6/2008 | Roberts et al. | 725/34 |
| 2009/0320063 A1 * | 12/2009 | Barrett | 725/34 |
| 2010/0251289 A1 * | 9/2010 | Agarwal et al. | 725/34 |

* cited by examiner

*Primary Examiner* — Pankaj Kumar
*Assistant Examiner* — Mulugeta Mengesha

(57) ABSTRACT

An exemplary method includes maintaining data representative of a plurality of advertisements each having one of a plurality of different resolutions, detecting a message indicative of an upcoming advertisement break in a media content program being transmitted to a media content access device by way of a content channel, detecting a resolution of the media content program, directing a dynamic advertisement delivery subsystem communicatively coupled to the media content access device to dynamically transmit a subset of the advertisements by way of one or more advertisement channels, wherein each advertisement included in the subset has the same resolution as the resolution of the media content program, and distributing tuning information associated with each of the one or more advertisement channels to the media content access device prior to an occurrence of the advertisement break. Corresponding methods and systems are also disclosed.

21 Claims, 11 Drawing Sheets

DYNAMIC ADVERTISEMENT INSERTION METHODS AND SYSTEMS

RELATED APPLICATIONS

The present application claims priority under 35 U.S.C. §119(e) to U.S. Provisional Patent Application No. 61/300,745 by Harpal S. Bassali et al., filed on Feb. 2, 2010, and entitled "Advertisement Insertion Systems and Methods," the contents of which are hereby incorporated by reference in their entirety.

BACKGROUND INFORMATION

The advent of set-top box devices and other media content access devices ("access devices") has provided users with access to a large number and variety of media content choices. For example, a user may choose to experience a variety of broadcast television programs, pay-per-view services, video-on-demand programming, Internet services, and audio programming via a set-top box device.

Such access devices have also provided service providers (e.g., television service providers) with an ability to present targeted advertising to specific users or groups of users. For example, designated advertisement channels may be used to deliver various targeted advertisements to an access device. An access device associated with a particular user may be directed by a head-end unit of a television service network to switch from being tuned to a content channel carrying a media content program to being tuned to one of the advertisement channels during an advertisement break in order to present advertisement content carried by the advertisement channel to the user. After the advertisement content has been presented, the access device may tune back to the content channel.

However, a mismatch in resolution between media content carried on a content channel and an advertisement channel to which an access device tunes may cause undesirable transition delays on some display devices (e.g., televisions) when the access device switches between the two channels. This limitation of display devices forces a service provider to transmit advertisement content by way of separate advertisement channels for each possible resolution (e.g., 480i, 480p, 720p, 1080i, 1080p, etc.). Each of these advertisement channels uses valuable bandwidth that could otherwise be used to distribute additional content channels.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
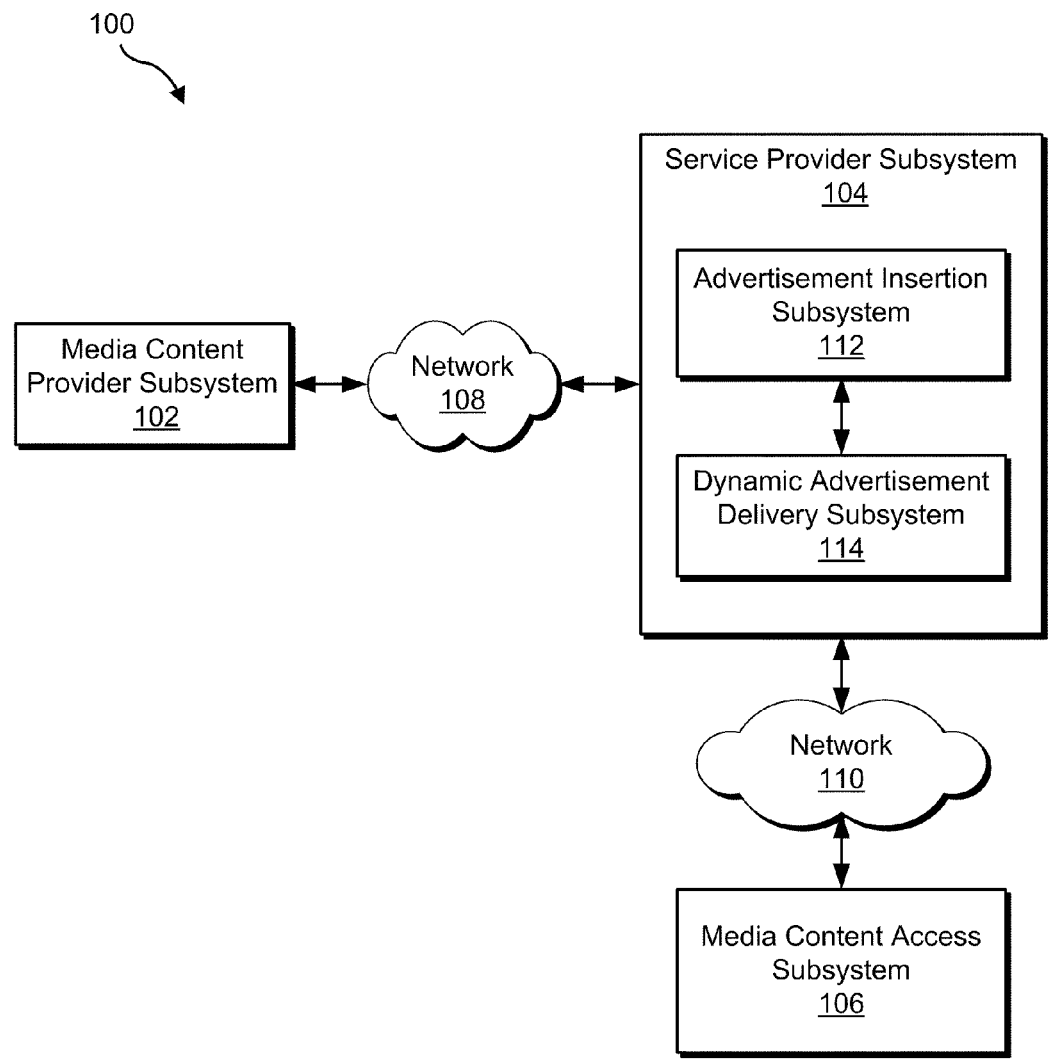
FIG. 1 illustrates an exemplary media content delivery system according to principles described herein.

Methods and systems for dynamically inserting one or more advertisements onto one or more advertisement channels are described herein. As described in more detail below, an advertisement insertion subsystem may be configured to maintain data representative of a plurality of advertisements each having one of a plurality of different resolutions. The advertisement insertion subsystem may be further configured to detect a message indicative of an upcoming advertisement break in a media content program being transmitted to a media content access device by way of a content channel, detect a resolution of the media content program, and direct a dynamic advertisement delivery subsystem communicatively coupled to the media content access device to dynamically transmit a subset of the advertisements by way of one or more advertisement channels. The subset of advertisements may be selected to have the same resolution as the resolution of the media content program. The advertisement insertion subsystem may be further configured to receive tuning information associated with each of the one or more advertisement channels from the dynamic advertisement delivery subsystem and distribute the tuning information to the media content access device prior to an occurrence of the advertisement break. The media content access device may use the tuning information to tune to one of the advertisement channels in order to present an advertisement carried by the advertisement channel to one or more users.

As will be described in more detail below, the methods and systems described herein may allow a service provider to dynamically provide a media content access device with only those advertisements that have the same resolution as a media content program to which the media content access device is tuned just prior the beginning of an advertisement break. In this manner, the service provider does not have to statically define advertisement channels for each resolution, thereby freeing bandwidth for other purposes (e.g., transmitting additional media content programs).

As used herein, the term "media content" may refer generally to any content made accessible by a media content delivery subsystem to a media content access subsystem. Media content may include, but is not limited to, any television program, on-demand media program, pay-per-view media program, broadcast media program (e.g., broadcast television program), multicast media program, narrowcast media program, IPTV content, advertisement (e.g., commercial), video, movie, song, or any segment, component, or combination of these or other forms of media content that may be viewed or otherwise experienced by a user.

As used herein, a "standard definition" (or "SD") resolution refers to a 480i resolution. A "high definition" (or "HD") resolution refers to a resolution that is higher than an SD resolution (e.g., a 480p resolution, a 720p resolution, a 1080i resolution, and/or a 1080p resolution). Any other resolution may be considered standard definition or high definition as may serve a particular implementation.

FIG. 1 illustrates an exemplary media content delivery system 100 (or simply "system 100"). System 100 may include a media content provider subsystem 102, a service provider subsystem 104, and a media content access subsystem 106 (or simply "access subsystem 106"). Media content provider subsystem 102 and service provider subsystem 104 may be configured to communicate with one another by way of network 108. Service provider subsystem 104 and access subsystem 106 may be configured to communicate with one another by way of network 110. As will be described in more detail below, service provider subsystem 104 may facilitate delivery of media content provided by media content provider subsystem 102 to access subsystem 106 by way of one or more content channels.

Media content provider subsystem 102, service provider subsystem 104, and access subsystem 104 may communicate using any suitable communication technologies, devices, networks, media, and protocols supportive of remote data communications. For example, media content provider subsystem 102 and service provider subsystem 104 may communicate over network 108 and service provider subsystem 104 and access subsystem 106 may communicate over network 110 using any communication platforms and technologies suitable for transporting media content and/or communication signals, including known communication technologies, devices, transmission media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, radio frequency ("RF") signaling technologies, wireless communication technologies (e.g., Bluetooth, Wi-Fi, etc.), optical transport and signaling technologies, live transmission technologies (e.g., media streaming technologies), media file transfer technologies, in-band and out-of-band signaling technologies, and other suitable communications technologies.

Networks 108 and 110 may each include one or more networks or types of networks (and communication links thereto) capable of carrying communications, media content, and/or data signals between media content provider subsystem 102, service provider subsystem 104, and access subsystem 106. For example, networks 108 and 110 may each include, but is not limited to, one or more wireless networks (e.g., satellite media broadcasting networks or terrestrial broadcasting networks), mobile telephone networks (e.g., cellular telephone networks), closed media networks, open media networks, subscriber television networks (e.g., broadcast, multicast, and/or narrowcast television networks), closed communication networks, open communication networks, satellite networks, cable networks, hybrid fiber coax networks, optical fiber networks, broadband networks, narrowband networks, the Internet, wide area networks, local area networks, public networks, private networks, packet-switched networks, and any other networks capable of carrying data and/or communications signals between media content provider subsystem 102, service provider subsystem 104, and access subsystem 106. Communications between media content provider subsystem 102, service provider subsystem 104, and access subsystem 106 may be transported using any one of above-listed networks, or any combination or sub-combination of the above-listed networks.

As shown in FIG. 1, service provider subsystem 104 may include an advertisement insertion subsystem 112 and a dynamic advertisement delivery subsystem 114 (or simply "advertisement delivery subsystem 114") communicatively coupled to one another. Advertisement insertion subsystem 112 and advertisement delivery subsystem 114 may be configured to facilitate dynamic insertion of one or more advertisements (e.g., targeted advertisements) onto one or more or advertisement channels delivered to access subsystem 106. In this manner, as will be described in more detail below, one or more advertisements provided by service provider subsystem 104 may be presented to a user of access subsystem 106.

Figure 2:
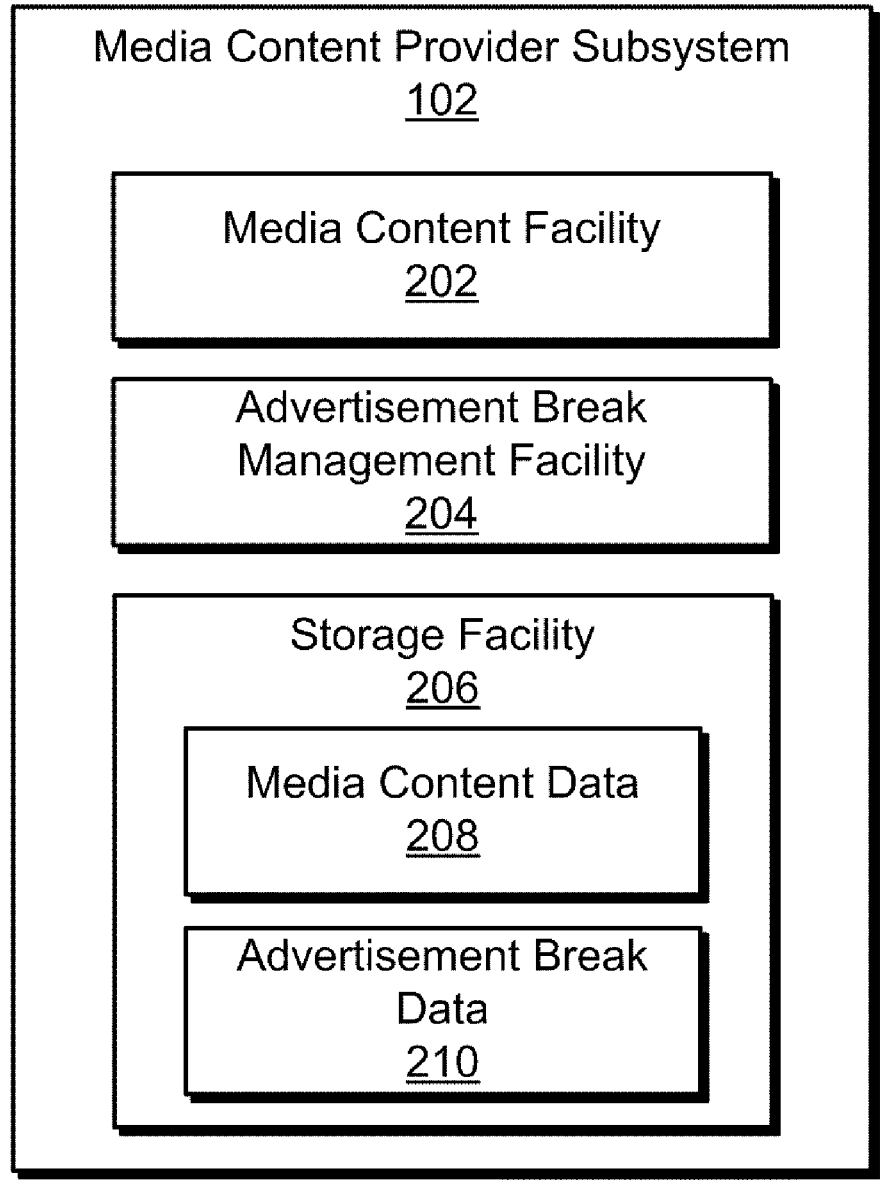
FIG. 2 illustrates exemplary components of a media content provider subsystem according to principles described herein.

FIG. 2 illustrates exemplary components of media content provider subsystem 102. As shown, media content provider subsystem 102 may include a media content facility 202, an advertisement break management facility 202, and a storage facility 206, which may be in communication with one another using any suitable communication technologies.

Media content facility 202 may be configured to manage (e.g., maintain, generate, process, and/or transmit) media content configured to be presented to one or more users of access subsystem 106. For example, media content facility 202 may be configured to maintain and transmit data representative of a media content program in the form of a media content stream to service provider subsystem 104. Service provider subsystem 104 may then distribute the media content stream to access subsystem 106.

Advertisement break management facility 204 may be configured to manage a placement of one or more advertisement breaks included in a media content stream provided to service provider subsystem 104. One or more advertisements may be presented to a user during each of the advertisement breaks. In some examples, one or more of the advertisements are included in the media content stream provided by media content facility 202. Additionally or alternatively, one or more of the advertisement breaks may be designated by advertisement break management facility 204 as being reserved for presentation of one or more advertisements provided by service provider subsystem 104. In this manner, service provider subsystem 104 may direct access subsystem 106 to tune away from the media content stream to one or more advertisement streams carried by way of one or more corresponding advertisement channels during the designated advertisement breaks in order to present one or more advertisements (e.g., targeted advertisements, local advertisements, etc.) to one or more users of access subsystem 106.

In some examples, advertisement break management facility 204 may be configured to insert a message (e.g., an in-band message) indicative of an upcoming advertisement break in the media content stream provided by media content facility 202. In this manner, as will be described in more detail below, service provider subsystem 104 may detect the message in an incoming media content stream and thereby know when to direct access subsystem 106 to present a targeted advertisement or the like to a user thereof. The message may additionally or alternatively be indicative of a duration of the advertisement break, a type of advertisement break (e.g., whether the advertisement break is reserved for service provider subsystem 104 to present one or more targeted advertisements), and/or any other information associated with the advertisement break as may serve a particular implementation.

Storage facility 206 may be configured to maintain media content data 208 representative of media content managed by media content facility 202 and advertisement break data 210 utilized by advertisement break management facility 204. It will be recognized that storage facility 206 may maintain additional or alternative data as may serve a particular implementation.

Figure 3:
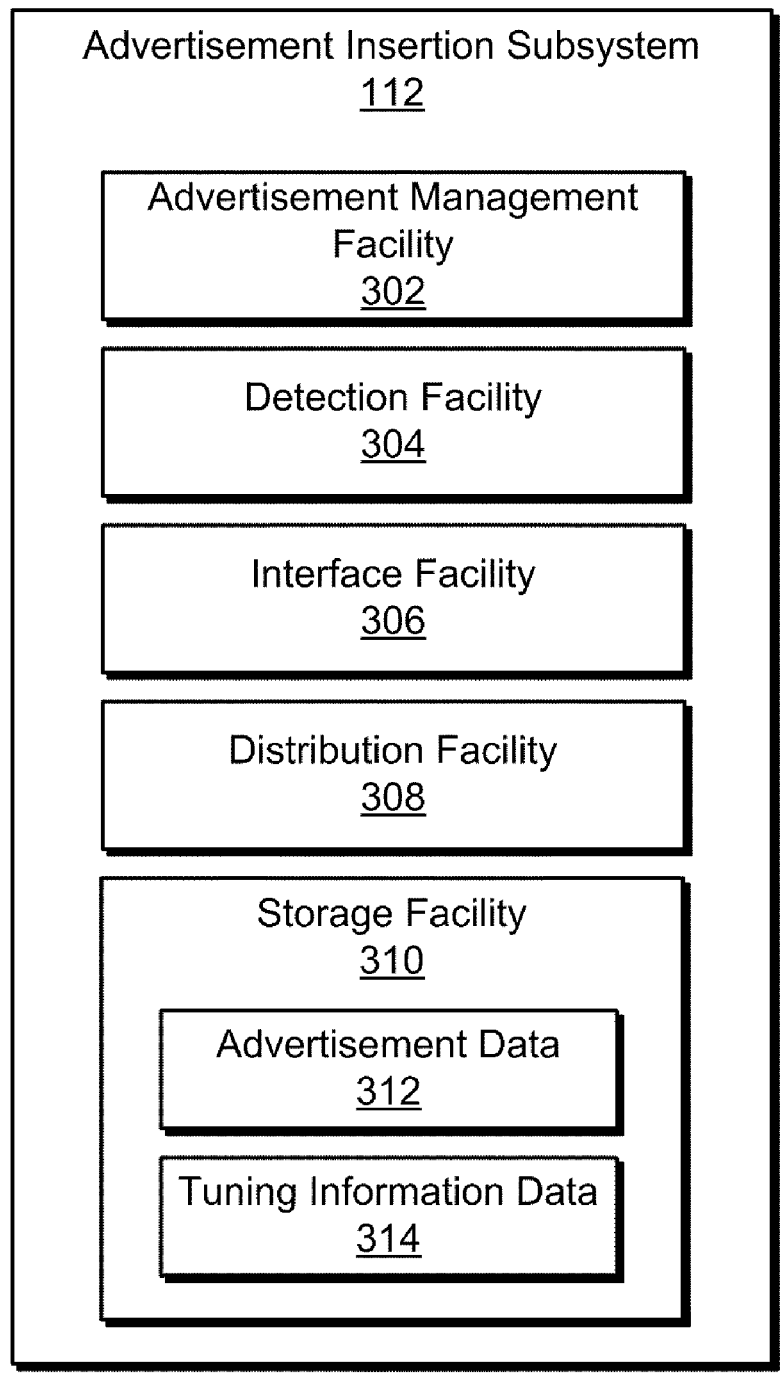
FIG. 3 illustrates exemplary components of an advertisement insertion subsystem according to principles described herein.

FIG. 3 illustrates exemplary components of advertisement insertion subsystem 112. As shown, advertisement insertion subsystem 112 may include an advertisement management facility 302, a detection facility 304, an interface facility 306, a distribution facility 308, and a storage facility 310, which may be in communication with one another using any suitable communication technologies.

Advertisement management facility 302 may be configured to manage (e.g., generate, process, maintain, etc.) a plurality of advertisements that may be dynamically inserted onto one or more advertisement channels and presented to a user of access facility 106. For example, advertisement management facility 302 may be configured to maintain data representative of a plurality of advertisements each having one of a plurality of different resolutions. To illustrate, advertisement management facility 302 may maintain data representative of advertisements having SD resolutions (e.g., 480i) and advertisements having various HD resolutions (e.g., 480p, 720p, 1080i, 1080p, etc.). It will be recognized that advertisement management facility 302 may be configured to maintain advertisements having additional or alternative resolutions as may serve a particular implementation.

In some examples, advertisement management facility 302 may maintain advertisements containing the same advertisement content in distinct resolutions. For example, advertisement management facility 302 may maintain an advertisement for a particular product in 480i, 480p, 720p, 1080i, and 1080p. In this manner, the same advertisement content may be presented in any desired resolution.

In some examples, the advertisements maintained by advertisement management facility 302 may include targeted advertisements. As will be described in more detail below, access subsystem 106 may be configured to select one or more of the targeted advertisements for presentation to a user in accordance with a targeted advertisement selection heuristic.

Detection facility 304 may be configured to detect a message indicative of an upcoming advertisement break in a media content program being transmitted to access subsystem 106 (which, as will be described in more detail below, may be implemented by a set-top box device or other media content access device) by way of a content channel. Detection facility 304 may detect the message in any suitable manner as may serve a particular implementation. For example, detection facility 304 may detect a message inserted into a media content stream by advertisement break management facility 204 of media content provider subsystem 102 and process the data included in the message in order to determine a time of occurrence of an advertisement break in a media content program represented by the media content stream.

Detection facility 304 may be further configured to detect a resolution of the media content program being transmitted to access subsystem 106 by way of the content channel. Detection facility in 304 may detect the resolution of the media content program in any suitable manner as may serve a particular implementation. For example, detection facility 304 may analyze data included in a media content stream being transmitted to access subsystem 106 and determine the resolution of the media content program represented by the media content stream based on the analysis. As another example, detection facility 304 may access metadata for the media content program and determine from the metadata the resolution of the media content program.

Interface facility 306 may be configured select a subset of one or more advertisements maintained by advertisement management facility 302 that have the same resolution as the resolution of the media content program. Interface facility 306 may be further configured to direct advertisement delivery subsystem 114 to dynamically insert or place the subset of advertisements onto one or more advertisement channels and transmit the subset of advertisements by way of the one or more advertisement channels. In this manner, as will be described in more detail below, only those advertisements that have the same resolution as the resolution of the media content program are inserted onto advertisement channels and transmitted to access subsystem 106 during an advertisement break.

In some examples, interface facility 306 may be configured to direct advertisement delivery subsystem 114 to begin transmitting the subset of advertisements a predetermined amount of time (e.g., a few seconds) before the advertisement break begins. The predetermined amount of time may be selected such that the advertisements are available to access subsystem 106 when the advertisement break begins, thereby avoiding any delays in presenting one or more of the advertisements.

Interface facility 306 may be further configured to direct advertisement delivery subsystem 114 to cease transmitting the subset of advertisements upon completion of the advertisement break. In this manner, bandwidth used in the transmission of the subset of advertisements may be used for one or more other purposes (e.g., transmitting other media content) after the advertisement break is over. One or more other advertisements may be subsequently inserted onto the one or more advertisement channels for transmission to access subsystem 106 during another advertisement break reserved for service provider subsystem 104.

Interface facility 306 may be further configured to receive data from advertisement delivery subsystem 114 that is representative of tuning information associated with each of the one or more advertisement channels by which the subset of advertisements are transmitted to access subsystem 106. As will be described below, the tuning information may include frequency information representative of a physical channel by which each of the one or more advertisement channels is transmitted and program identifier information that distinguishes each of the one or more advertisement channels from one another.

Distribution facility 308 may be configured to distribute the tuning information associated with each of the one or more advertisement channels to access subsystem 106. As will be described in more detail below, access subsystem 106 may use the tuning information to tune to a selected advertisement channel included in the one or more advertisement channels. Distribution facility 308 may be additionally or alternatively configured to distribute media content (e.g., in the form of one or more media content streams) and/or any other data to access subsystem 106 as may serve a particular implementation.

Storage facility 310 may be configured to maintain advertisement data 312 representative of the advertisements maintained by advertisement management facility 302 and tuning information data 314 representative of the tuning information received by interface facility 306. It will be recognized that storage facility 310 may maintain additional or alternative data as may serve a particular implementation.

Figure 4:
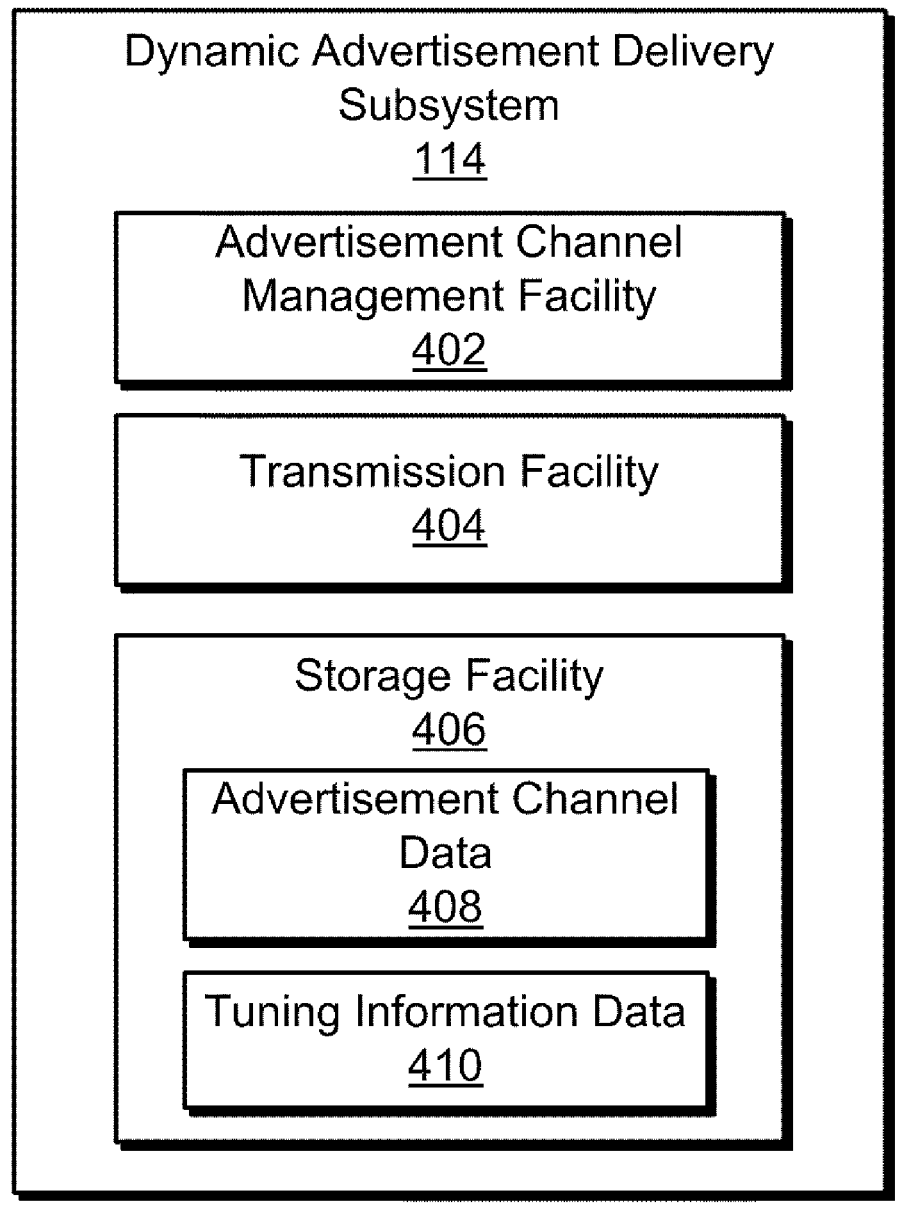
FIG. 4 illustrates exemplary components of a dynamic advertisement delivery subsystem according to principles described herein.

FIG. 4 illustrates exemplary components of advertisement delivery subsystem 114 (which, for example) may be implemented by a switched digital video ("SDV") subsystem or server). As shown, advertisement delivery subsystem 114 may include an advertisement channel management facility 402, a transmission facility 404, and a storage facility 406, which may be in communication with one another using any suitable communication technologies.

Advertisement channel management facility 402 may be configured to dynamically manage advertisement channels by which one or more advertisements are transmitted to access subsystem 106. For example, in response to a request provided by advertisement insertion subsystem 112, advertisement channel management facility 402 may be configured to dynamically associate an advertisement with a particular advertisement channel (e.g., insert the advertisement onto the advertisement channel) and then direct transmission facility 404 to transmit the advertisement by way of the advertisement channel during an advertisement break.

In some examples, advertisement channel management facility 402 may be configured to manage how an advertisement channel is provided to access subsystem 106. For example, advertisement channel management facility 402 may define an advertisement channel as a digital channel or stream modulated onto a particular frequency band (referred to herein as a "physical channel"). To illustrate, a quadrature amplitude modulation ("QAM") heuristic may be used to modulate a plurality of advertisement channels (e.g., in the form of a multiplexed transport stream) onto a particular frequency band (e.g., a 6 MHz frequency band).

The number of advertisement channels that may be modulated onto a particular QAM channel varies depending on the resolution of the advertisements carried by way of the advertisement channels. For example, in some cases, ten SD advertisement channels may be modulated onto a QAM channel while two or three HD advertisement channels may be modulated onto another QAM channel. When multiple advertisement channels are modulated onto a single physical channel (e.g., in the form of a multiplexed transport stream), each advertisement channel may be represented by a program identifier (e.g., a program number).

It will be recognized that any number of SD and/or HD advertisement channels may be modulated onto the same QAM channel as may serve a particular implementation. It will also be recognized that any other modulation scheme may be used to transport advertisement channels by way of a physical channel as may serve a particular implementation.

In some examples, advertisement channel management facility 402 may be further configured to manage bandwidth associated with each physical channel onto which advertisement channels are modulated. For example, advertisement channel management facility 402 may keep track of the bandwidth currently being used to present advertisements and appropriately reserve bandwidth within a physical channel for an advertisement channel with a content channel goes into an advertisement break. In some examples, the bandwidth management is performed in conjunction with or at the direction of interface facility 306 of advertisement insertion subsystem 112.

In some examples, advertisement channel management facility 402 may be further configured to provide advertisement insertion subsystem 112 with tuning information associated with the one or more advertisement channels by which the subset of advertisements are transmitted. The tuning information may include, but is not limited to, frequency information representative of a frequency band of the physical channel by which each of the one or more advertisement channels is transmitted and program identifier information associated with each of the one or more advertisement channels. Advertisement insertion subsystem 112 may in turn distribute the tuning information to access subsystem 106 as described above.

Transmission facility 404 may be configured to transmit the subset of advertisements by way of one or more advertisement channels specified by advertisement channel management facility 402. The subset of advertisements may be transmitted in any suitable manner as may serve a particular implementation. As will be described in more detail below, access subsystem 106 may tune to one of the advertisement channels in order to present an advertisement carried by the advertisement channel to one or more users.

Storage facility 406 may be configured to maintain advertisement channel data 408 utilized by advertisement channel management facility 402 and tuning information data 410 utilized by advertisement channel management facility 402. It will be recognized that storage facility 406 may be configured to maintain additional or alternative data as may serve a particular implementation.

Figure 5:
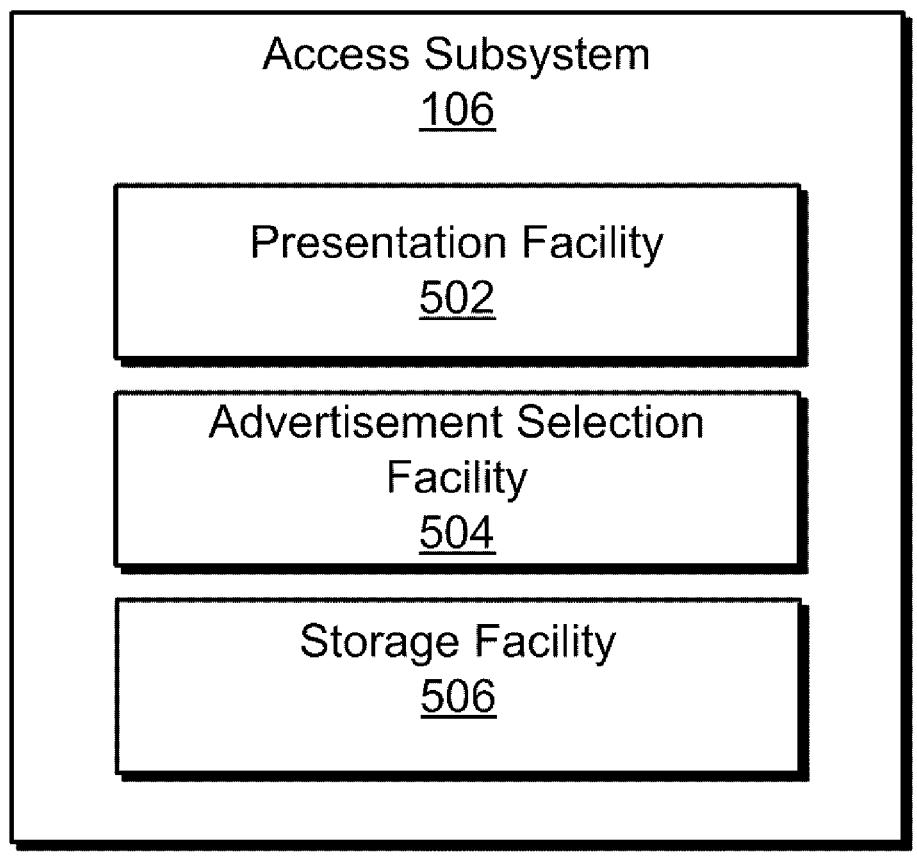
FIG. 5 illustrates exemplary components of an access subsystem according to principles described herein.

FIG. 5 illustrates exemplary components of access subsystem 106. As shown, access subsystem 106 may include a presentation facility 502, an advertisement selection facility 504, and a storage facility 506, which may be in communication with one another using any suitable communication technologies.

Presentation facility 502 may be configured to control a presentation of media content to a user of access subsystem 106. For example, presentation facility 502 may be configured to display or otherwise present one or more media content programs, one or more advertisements, and/or any other media content to a user.

Advertisement selection facility 504 may be configured to dynamically select an advertisement provided by service provider subsystem 104 for presentation to a user. For example, access subsystem 106 may be configured to tune to an advertisement channel included in the one or more advertisement channels transmitted by advertisement delivery subsystem 114 in accordance with the tuning information provided by advertisement insertion subsystem 112. Presentation facility 502 may then present the selected advertisement carried by the advertisement channel during an advertisement break.

In some examples, advertisement selection facility 504 may be configured to operate in accordance with a targeted advertisement selection heuristic. For example, advertisement selection facility 504 may determine which of the advertisements included in the subset of advertisements is most relevant to a user of access subsystem 106 and tune to the advertisement channel carrying that advertisement so that the advertisement may be presented to the user. The determination may be made in accordance with information provided by service provider subsystem 104 to access subsystem 106 describing the contents of each of the advertisements included in the subset of advertisements, a user profile associated with the user, and/or any other information as may serve a particular implementation. Once an advertisement is selected, advertisement selection facility 504 may direct presentation facility 502 to tune to the advertisement channel carrying the selected advertisement in order to present the selected advertisement to the user.

Storage facility 506 may be configured to maintain data utilized by presentation facility 502 and/or advertisement selection facility 504. For example, storage facility 506 may maintain user profile data, media content data, and/or any other type of data as may serve a particular implementation.

Figure 6:
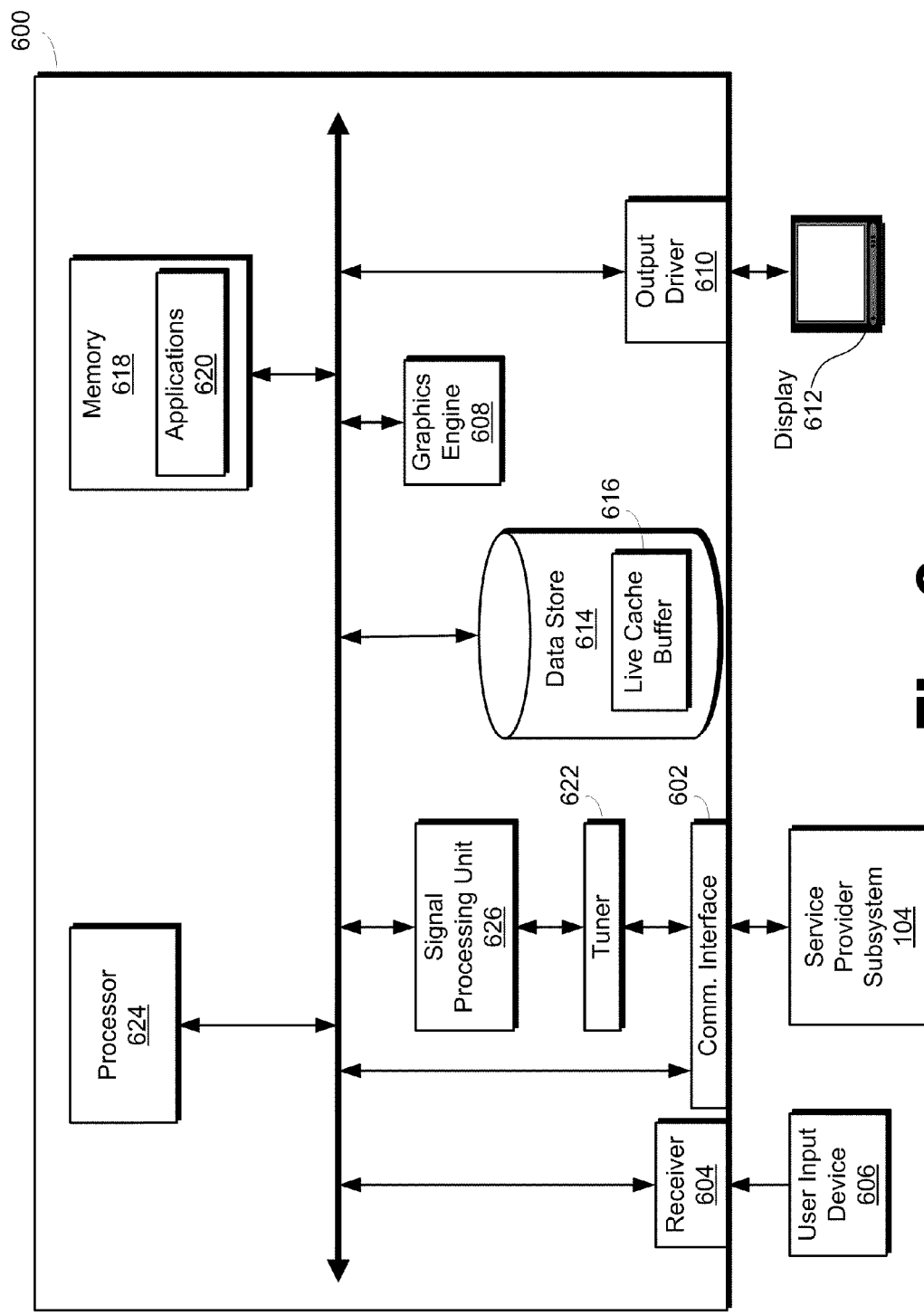
FIG. 6 illustrates an exemplary media content access device according to principles described herein.

Access subsystem 106 and/or components of access subsystem 106 may be implemented as may suit a particular application. FIG. 6 illustrates an exemplary media content access device 600 (or simply "device 600") having access subsystem 106 implemented thereon. Device 600 may include one or more of the components of access subsystem 106 shown in FIG. 6 and may be configured to perform one or more of the processes and/or operations described herein. Device 600 may include, but is not limited to, a set-top box device, a digital video recorder ("DVR") device, a multi-room DVR device, a media content processing device, a communications device, a mobile device (e.g., a mobile phone device), a handheld device, a personal computer, a phone device, a personal-digital assistant device, a gaming device, a television device, and/or any device configured to perform one or more of the processes and/or operations described herein.

As shown in FIG. 6, device 600 may include a communication interface 602 configured to receive media content and/or data (e.g., tuning information, metadata, program guide data, and/or any other data associated with media content) in any acceptable format from service provider subsystem 104 or from any other suitable external source. Communication interface 602 may include any device, logic, and/or other technologies suitable for receiving signals and/or data representative of media content and/or other types of media content or data. Communication interface 602 may be configured to interface with any suitable communication media, protocols, and formats, including any of those mentioned above.

Device 600 may include a receiver 604 configured to receive user input signals from a user input device 606. User input device 606 may include, for example, a remote control device or any other suitable input device and may be configured to communicate with receiver 604 via a wireless link, electrical connection, or any other suitable communication link.

Device 600 may include a graphics engine 608 and an output driver 610. Graphics engine 608 may be configured to generate graphics to be provided to output driver 610, which may be configured to interface with or drive a display 612. Output driver 610 may provide output signals to display 612, the output signals including graphical media content (e.g., media content) generated by graphics engine 608 and to be presented by display 612 for experiencing by a user. For example, output driver 610 may provide data representative of a graphical user interface ("GUI") including a program guide view or a media playback view to display 612 for presentation to the user. Graphics engine 608 and output driver 610 may include any combination of hardware, software, and/or firmware as may serve a particular implementation.

Data store 614 may include one or more data storage media, devices, or configurations and may employ any type, form, and combination of storage media. For example, data store 614 may include, but is not limited to, a hard drive, network drive, flash drive, magnetic disc, optical disc, or other non-volatile storage unit. Media content and/or data associated with media content may be temporarily and/or permanently stored in data store 614.

Data store 614 is shown to be included within device 600 in FIG. 6 for illustrative purposes only. It will be understood that data store 614 may additionally or alternatively be located external to device 600.

Data store 614 may include one or more live cache buffers 616. Live cache buffer 616 may additionally or alternatively reside in memory 618 or in a storage device external to device 600. In some examples, media content data may be temporarily stored in live cache buffer 616 to facilitate recording of media content and/or presentation of media content in one or more trick play modes.

Device 600 may include memory 618. Memory 618 may include, but is not limited to, FLASH memory, random access memory ("RAM"), dynamic RAM ("DRAM"), other suitable computer-readable media, or any combination or sub-combination thereof. In some examples, one or more applications 620 configured to run on or otherwise be executed by device 600 may reside in memory 618.

Device 600 may include one or more tuners 622. Tuner 622 may be configured to selectively receive media content carried on a particular content channel or advertisement channel such that the media content may be processed by device 600. In some examples, media content received by tuner 622 may be temporarily buffered, or stored, in the live cache buffer 616. If there are multiple tuners 622, there may be a live cache buffer 616 corresponding to each of the tuners 622.

While tuner 622 may be used to receive certain media content-carrying signals transmitted by service provider subsystem 104, device 600 may be configured to receive other types of media content signals (including media content signals and/or program guide data signals) from service provider subsystem 104 and/or one or more other sources without using a tuner. For example, service provider subsystem 104 may transmit digital streams of data packets (e.g., Internet Protocol ("IP") based data packets) that can be received without using a tuner. For such types of media content signals, communication interface 602 may receive and forward the signals directly to other components of device 600 (e.g., processor 624 or signal processing unit 626) without the signals going through tuner 622. For an IP-based signal, for example, signal processing unit 626 may function as an IP receiver.

Device 600 may include at least one processor, such as processor 624, configured to control and/or perform one or more operations of device 600. Device 600 may also include a signal processing unit 626 configured to process incoming media content. Signal processing unit 626 may be configured, for example, to demodulate and parse encoded digital media content. In some examples, device 600 may include one or more signal processing units 626 corresponding to each of the tuners 622.

Figure 7:
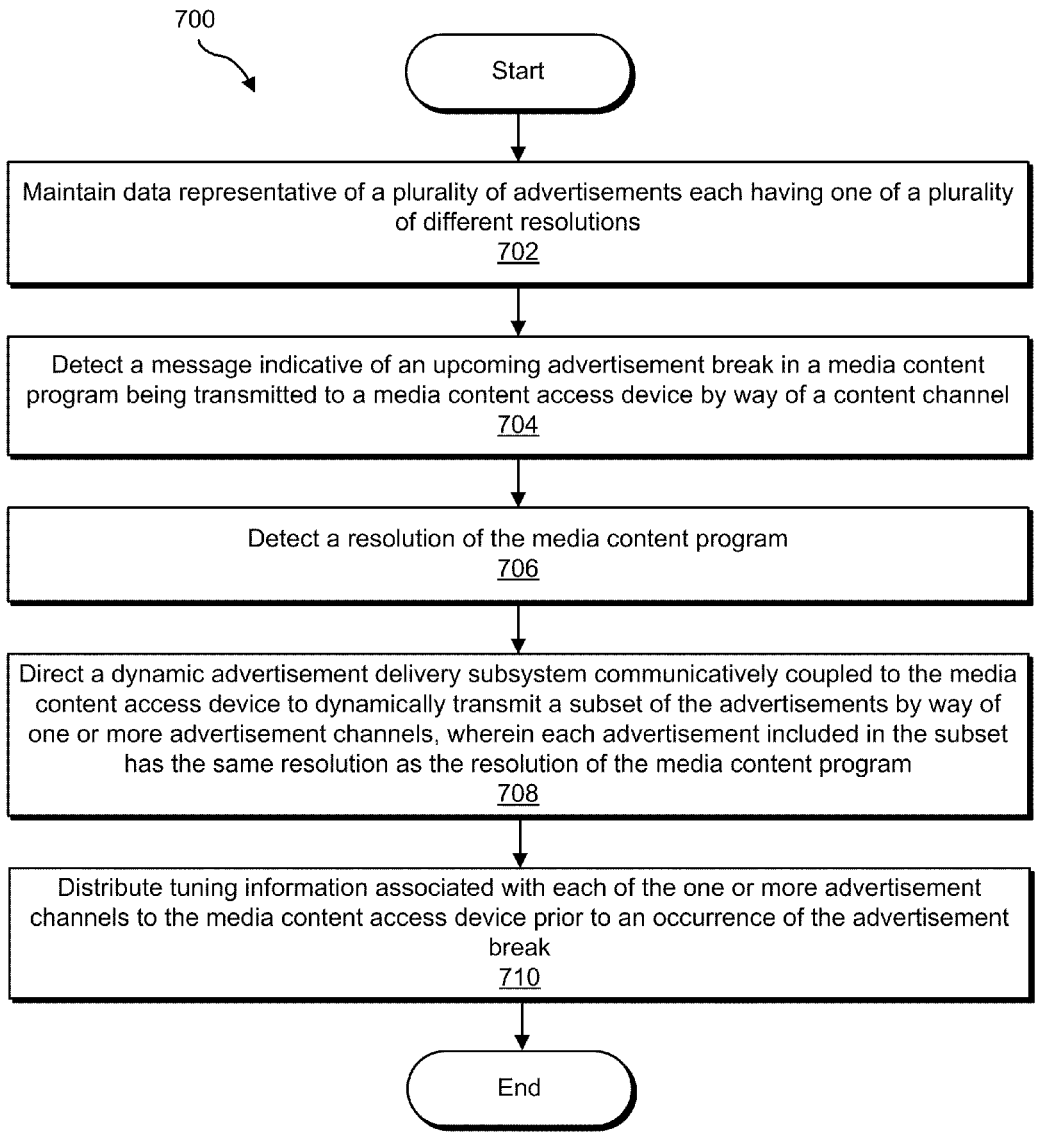
FIG. 7 illustrates an exemplary dynamic advertisement insertion method according to principles described herein.

FIG. 7 illustrates an exemplary dynamic advertisement insertion method 700. While FIG. 7 illustrates exemplary steps according to one embodiment, other embodiments may omit, add to, reorder, and/or modify any of the steps shown in FIG. 7. The steps shown in FIG. 7 may be performed by any component or combination of components of service provider subsystem 104 (e.g., advertisement insertion subsystem 112).

In step 702, data representative of a plurality of advertisements each having one of a plurality of different resolutions is maintained. The advertisements may be maintained in any of the ways described herein. For example, advertisement insertion subsystem 112 may be configured to maintain a plurality of distinct advertisements in each of a plurality of resolutions from which access subsystem 106 may choose in accordance with a targeted advertisement selection heuristic. To illustrate, advertisement insertion subsystem may maintain forty advertisements in SD (e.g., 480i) and in various HD resolutions (e.g., 480p, 720p, 1080i, and 1080p). It will be recognized that advertisement insertion subsystem 112 may maintain any number of advertisements in each of any number of resolutions as may serve a particular implementation.

In step 704, a message indicative of an upcoming advertisement break in a media content program being transmitted to a media content access device by way of a content channel is detected. The message may be detected in any of the ways described herein.

Figure 8:
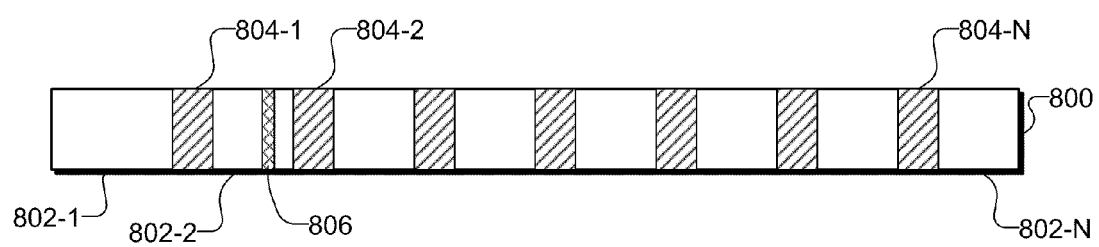
FIG. 8 shows an exemplary media content stream according to principles described herein.

To illustrate, FIG. 8 shows an exemplary media content stream 800 that may be transmitted by service provider subsystem 104 to an access device (e.g., access device 600). As shown in FIG. 8, media content stream 800 may include program segments 802 (e.g., program segments 802-1 through 802-N) representative of a media content program and a plurality of advertisement breaks 804 (e.g., advertisement breaks 804-1 through 804-N) interspersed therein. One or more advertisements may be presented to viewers of the media content program during advertisement breaks 804. Each advertisement break 804 may be of any suitable duration as may serve a particular implementation.

One or more of the advertisements presented to viewers of the media content program represented by the media content stream 800 during each advertisement break 804 may be included in media content stream 800 itself. Additionally or alternatively, one or more of the advertisements presented to viewers of the media content program represented by the media content stream 800 during each advertisement break 804 may be included in one or more separate advertisement streams transmitted by way of one or more advertisement channels.

For example, non-targeted advertisements (e.g., national advertisements) intended for all viewers of the media content program represented by media content stream 800 may be included directly in media content stream 800. In this manner, access subsystem 106 does not have to tune to a different content channel during each advertisement break 804 in order to present the non-targeted advertisements to the viewers.

Additionally or alternatively, one or more advertisement breaks 804 may be reserved for service provider subsystem 104 to present one or more advertisements (e.g., targeted advertisements) intended for one or more particular viewers of the media content program. For example, advertisement break 804-2 may be reserved for service provider subsystem 104 to present a targeted advertisement to one or more viewers of the media content program represented by media content stream 800. Hence, media content provider subsystem 102 may insert message 806 into media content stream 800 in order to notify service provider subsystem 104 that advertisement break 804-2 will begin at a predetermined time. Message 806 may be further configured to provide other information about advertisement break 804-2 such as, but not limited to, a length of time of advertisement break 804-2, a context of advertisement break 804-2 (e.g., information descriptive of program segments 802 surrounding advertisement break 804-2, and/or any other information as may serve a particular implementation. Message 806 may precede advertisement break 804-2 within media content stream 800 by any suitable amount of time (e.g., a few seconds).

Returning to FIG. 7, in step 706, a resolution of the media content program is detected. Advertisement insertion subsystem 112 may be configured to detect the resolution of the media content programming in any of the ways described herein.

In step 708, a dynamic advertisement delivery subsystem (e.g., advertisement delivery subsystem 114) communicatively coupled to the media content access device is directed to dynamically transmit a subset of advertisements maintained in step 702 by way of one or more advertisement channels. Each advertisement selected to be included in the subset has the same resolution as the resolution of the media content program.

To illustrate, advertisement insertion subsystem 112 may be configured to select ten advertisements included in the maintained advertisements and direct advertisement delivery subsystem 114 to dynamically insert the ten advertisements onto ten corresponding advertisement channels and transmit the ten advertisements to access device 600 by way of the ten advertisement channels. In some examples, advertisement insertion subsystem 112 may be configured to verify an availability of bandwidth needed to transmit the advertisements by way of the advertisement channels.

In step 710, tuning information associated with each of the one or more advertisement channels is distributed to the media content access device prior to an occurrence of the advertisement break. The tuning information may be distributed in any of the ways described herein. For example, advertisement insertion subsystem 112 may distribute tuning information associated with each of the ten advertisement channels previously described to access device 600 in the form of an in-band message or the like. Access device 600 may then tune to one of the ten advertisement channels in accordance with the tuning information and in accordance with a targeted advertisement selection heuristic to present one of the ten advertisements deemed most relevant to a user of access device 600.

Figure 9:
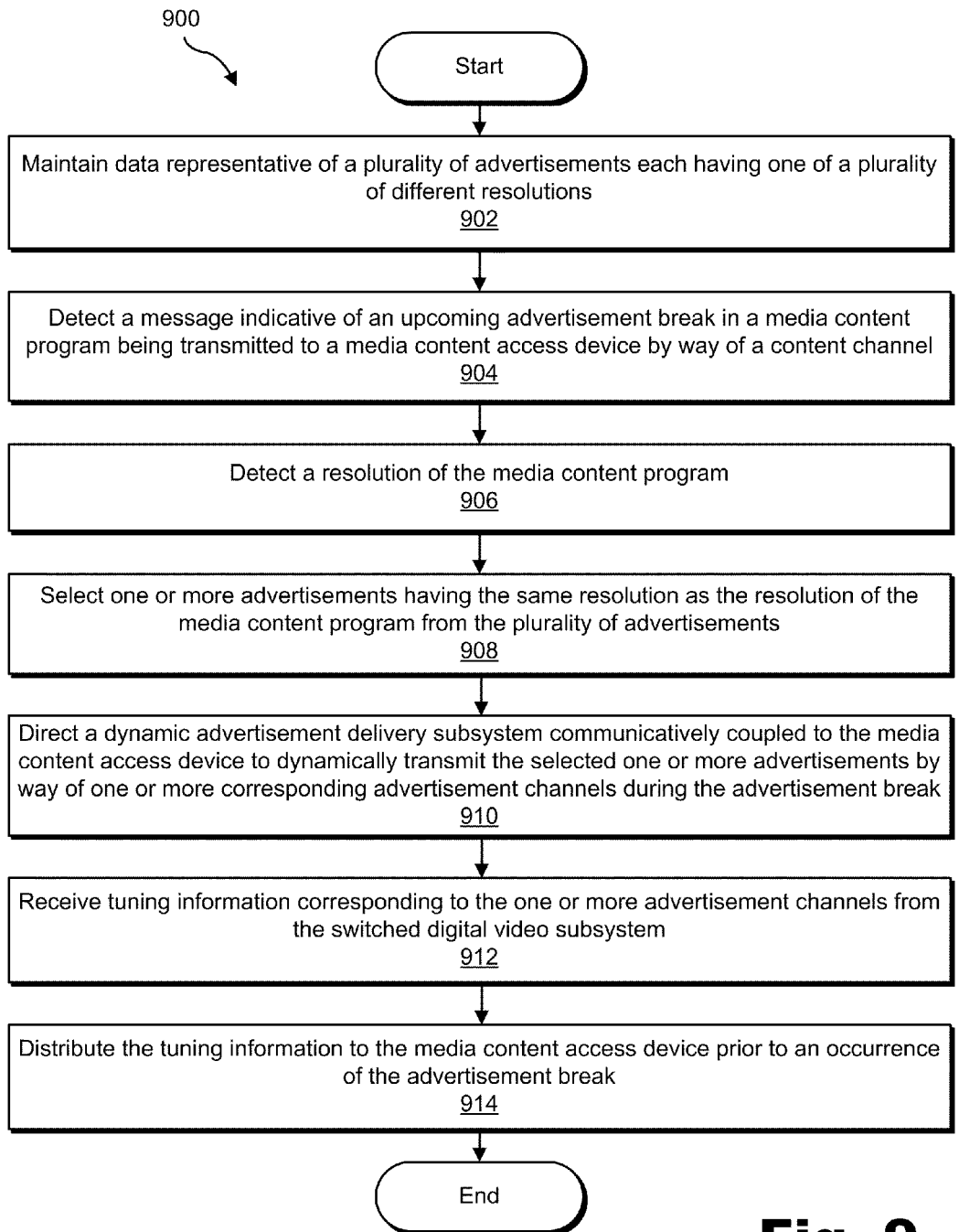
FIG. 9 illustrates another exemplary dynamic advertisement insertion method according to principles described herein.

FIG. 9 illustrates another exemplary dynamic advertisement insertion method 900. While FIG. 9 illustrates exemplary steps according to one embodiment, other embodiments may omit, add to, reorder, and/or modify any of the steps shown in FIG. 9. The steps shown in FIG. 9 may be performed by any component or combination of components of service provider subsystem 104 (e.g., advertisement insertion subsystem 112).

In step 902, data representative of a plurality of advertisements each having one of a plurality of different resolutions is maintained. The advertisements may be maintained in any of the ways described herein.

In step 904, a message indicative of an upcoming advertisement break in a media content program being transmitted to a media content access device by way of a content channel is detected. The message may be detected in any of the ways described herein.

In step 906, a resolution of the media content program is detected. The resolution of the media content program may be detected in any of the ways described herein.

In step 908, one or more advertisements having the same resolution as the resolution of the media content program are selected from the plurality of advertisements. The one or more advertisements may be selected in any suitable manner as may serve a particular implementation.

In step 910, a dynamic advertisement delivery subsystem communicatively coupled to the media content access device is directed to dynamically transmit the selected one or more advertisements by way of one or more corresponding advertisement channels during the advertisement break. Step 910 may be performed in any of the ways described herein.

In step 912, tuning information corresponding to the one or more advertisement channels is received from the advertisement delivery subsystem. Step 912 may be performed in any of the ways described herein.

In step 914, the tuning information is distributed to the media content access device prior to an occurrence of the advertisement break. Step 914 may be performed in any of the ways described herein.

Figure 10:
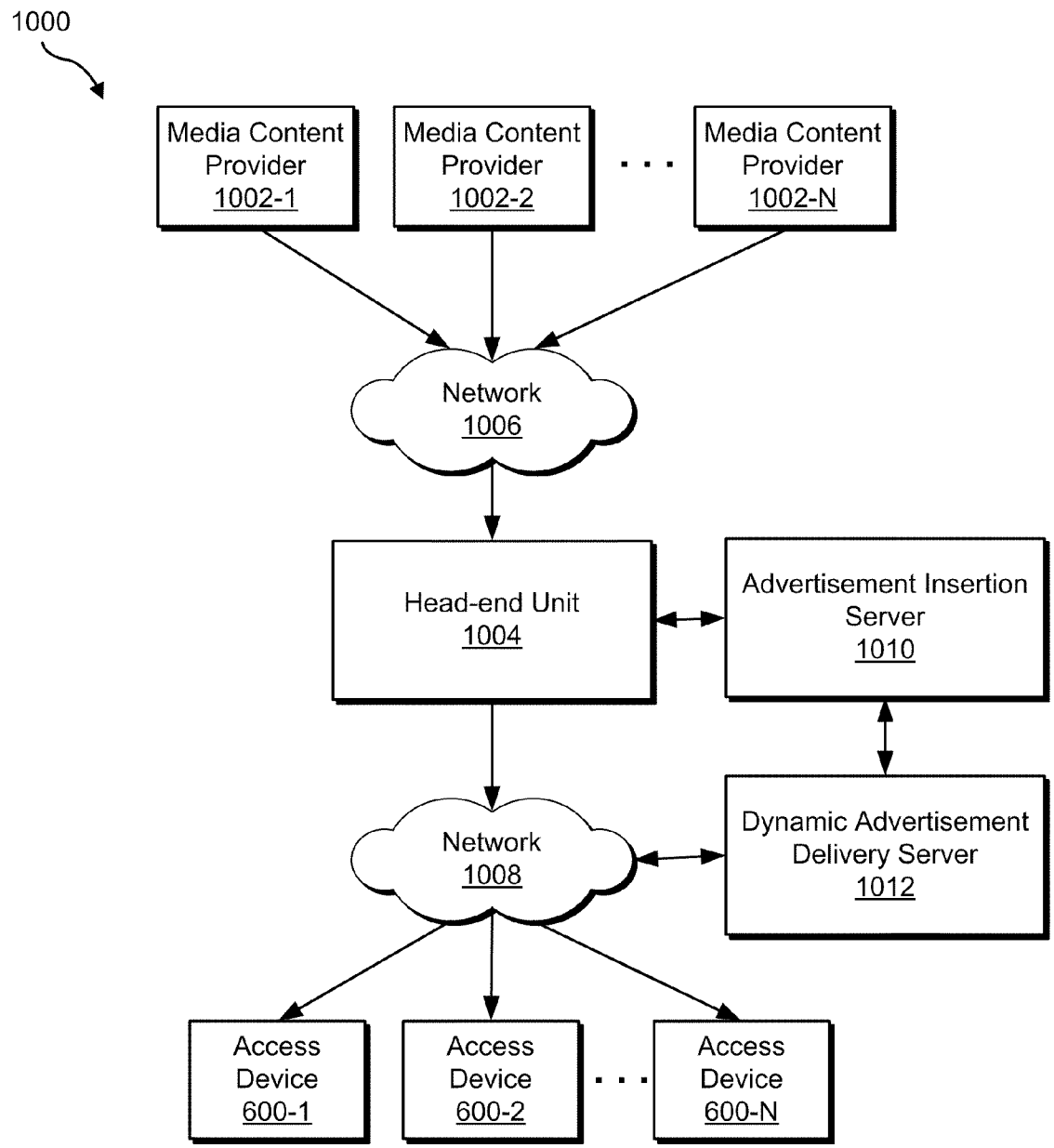
FIG. 10 illustrates an exemplary implementation of the system of FIG. 1 according to principles described herein.

A specific implementation of the systems and methods described herein will now be described in connection with FIG. 10. FIG. 10 illustrates an exemplary configuration 1000 wherein media content provider subsystem 102 is implemented by a plurality of media content providers 1002-1 through 1002-N (collectively referred to herein as "media content providers 1002") configured to communicate with a head-end unit 1004 via a network 1006. Head-end unit 1004 may be owned, operated, or otherwise associated with a service provider (e.g., a subscriber television service provider) and may be configured to communicate with a plurality of access devices 600-1 through 600-N (collectively referred to herein as "access devices 600") via a network 1008. Networks 1006 and 1008 may include any of the networks described herein. In some examples, networks 1006 and 1008 comprise a single network.

In some examples, media content providers 1002 may each include one or more components configured to provide one or more media content streams (e.g., media content stream 800) to head-end unit 1004 via network 1006. In some alternative examples, one or more of the media content providers 1002 may be configured to provide one or more program streams directly to head-end unit 1004 without transmitting data via network 1006.

Head-end unit 1004 may include one or more components configured to acquire media content from media content providers 1002 and distribute the media content to access devices 600 via network 1008. An exemplary head-end unit 1004 may include a video head-end and/or a video hub office configured to acquire and distribute national, regional, and/or local broadcast and/or video-on-demand media content to access devices 600.

In some examples, head-end unit 1004 may be communicatively coupled to an advertisement insertion server 1010, which may be communicatively coupled to a dynamic advertisement delivery server 1012. Dynamic advertisement delivery server 1012 may be communicatively coupled to access devices 600 by way of network 1008 and may include a switched digital video server and/or any other type of server as may serve a particular implementation.

Head-end unit 1004, advertisement insertion server 1010, and dynamic advertisement delivery server 1012 may each implement at least a portion of service provider subsystem 104. For example, head-end unit 1004 and advertisement insertion server 1010 may be configured to implement advertisement insertion subsystem 112, while dynamic advertisement delivery server 1012 may be configured to implement advertisement delivery subsystem 114.

To illustrate, head-end unit 1004 may detect a message indicative of an upcoming advertisement break in a media content program being transmitted to media content access devices 600 by way of a content channel, detect a resolution of the media content program, and transmit data representative of the message and the resolution to advertisement insertion server 1010. Advertisement insertion server 1010 may select one or more advertisements having the same resolution as the resolution of the media content program from a plurality of advertisements and transmit a request to dynamic advertisement delivery server 1012 to dynamically transmit the selected one or more advertisements by way of one or more advertisement channels. Dynamic advertisement delivery server 1012 may transmit the one or more advertisements by way of the one or more advertisement channels in response to the request and provide advertisement insertion server 1010 with tuning information associated with each of the one or more advertisement channels. Advertisement insertion server 1010 may provide head-end unit 1004 with the tuning information received from dynamic advertisement delivery server 1012. Head-end unit 1004 may distribute the tuning information to media content access devices 600, which may each use the tuning information to tune to one of the one or more advertisements during the advertisement break.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied on a non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 11:
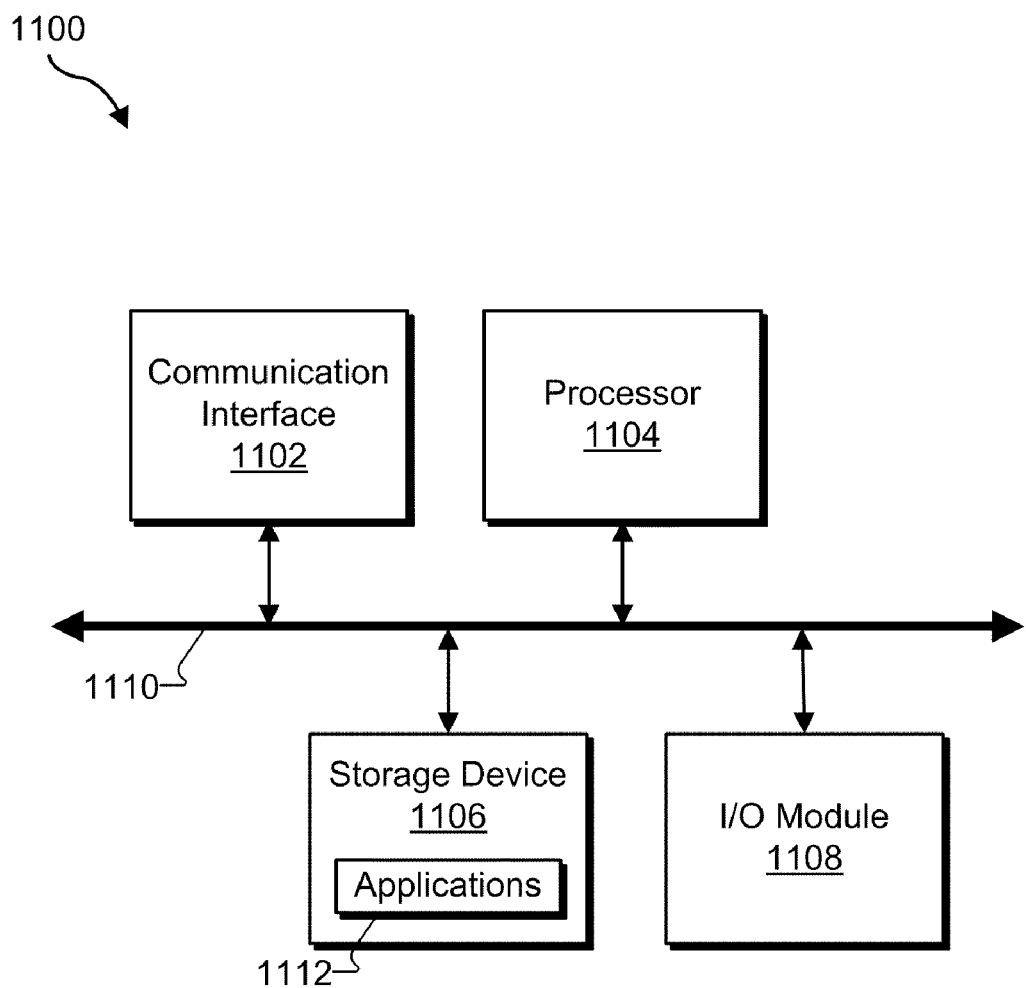
FIG. 11 illustrates an exemplary computing device according to principles described herein.

FIG. 11 illustrates an exemplary computing device 1100 that may be configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, and any other suitable interface. Communication interface 1102 may additionally or alternatively provide such a connection through, for example, a local area network (such as an Ethernet network), a personal area network, a telephone or cable network, a satellite data connection, a dedicated URL, or any other suitable connection. Communication interface 1102 may be configured to interface with any suitable communication media, protocols, and formats, including any of those mentioned above.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another non-transitory computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1106. For example, data representative of one or more executable applications 1112 (which may include, but are not limited to, one or more of the software applications described herein) configured to direct processor 1104 to perform any of the operations described herein may be stored within storage device 1106. In some examples, data may be arranged in one or more databases residing within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1108 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with media content facility 202, advertisement break management facility 204, advertisement management facility 302, detection facility 304, interface facility 306, distribution facility 308, advertisement channel management facility 402, transmission facility 404, presentation facility 502, and/or advertisement selection facility 504. Likewise, storage facilities 206, 310, 406, and/or 506 may be implemented by or within storage device 1106.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   maintaining, by an advertisement insertion subsystem, data representative of a plurality of advertisements each having one of a plurality of different resolutions;
   detecting, by the advertisement insertion subsystem, a message indicative of an upcoming advertisement break in a media content program being transmitted to a media content access device by way of a content channel;
   detecting, by the advertisement insertion subsystem, a resolution of the media content program;
   directing, by the advertisement insertion subsystem, a dynamic advertisement delivery subsystem communicatively coupled to the media content access device to dynamically transmit a subset of the advertisements by way of one or more advertisement channels, wherein each advertisement included in the subset has the same resolution as the resolution of the media content program; and
   distributing, by the advertisement insertion subsystem prior to an occurrence of the advertisement break, tuning information associated with each of the one or more advertisement channels to the media content access device.

2. The method of claim 1, further comprising:
   tuning, by the media content access device, to an advertisement channel included in the one or more advertisement channels in accordance with the tuning information; and
   presenting, by the media content access device, an advertisement carried by the advertisement channel during the advertisement break.

3. The method of claim 2, wherein the tuning is further performed in accordance with a targeted advertisement selection heuristic.

4. The method of claim 2, further comprising tuning, by the media content access device, back to the content channel upon completion of the advertisement break.

5. The method of claim 1, further comprising:
   detecting, by the advertisement insertion subsystem, another message indicative of another upcoming advertisement break in another media content program being transmitted to another media content access device by way of another content channel;
   detecting, by the advertisement insertion subsystem, another resolution of the other media content program;
   directing, by the advertisement insertion subsystem, the dynamic advertisement delivery subsystem to dynamically transmit another subset of the advertisements by way of one or more other advertisement channels, wherein each advertisement included in the other subset has the same resolution as the other resolution of the other media content program; and
   distributing, by the advertisement insertion subsystem prior to an occurrence of the other advertisement break, tuning information associated with each of the one or more other advertisement channels to the other media content access device.

6. The method of claim 1, further comprising:
detecting, by the advertisement insertion subsystem, a message indicative of another upcoming advertisement break in the media content program being transmitted to a media content access device by way of the content channel;
directing, by the advertisement insertion subsystem, the dynamic advertisement delivery subsystem to dynamically transmit another subset of the advertisements by way of the one or more advertisement channels, wherein each advertisement included in the another subset has the same resolution as the resolution of the media content program; and
distributing, by the advertisement insertion subsystem prior to an occurrence of the another advertisement break, updated tuning information associated with each of the one or more advertisement channels to the media content access device.

7. The method of claim 1, wherein the directing further comprises directing the dynamic advertisement delivery subsystem to begin transmitting the subset of the advertisements by way of the one or more advertisement channels a predetermined amount of time before a beginning of the advertisement break.

8. The method of claim 1, further comprising directing, by the advertisement insertion subsystem, the dynamic advertisement delivery subsystem to cease transmitting the subset of the advertisements upon completion of the advertisement break.

9. The method of claim 1, wherein the directing further comprises directing the dynamic advertisement delivery subsystem to dynamically transmit the subset of the advertisements in accordance with a quadrature amplitude modulation heuristic.

10. The method of claim 1, further comprising receiving, by the advertisement insertion subsystem in response to the directing and prior to the distributing, the tuning information.

11. The method of claim 1, wherein the tuning information comprises frequency information representative of a physical channel by which each of the one or more advertisement channels is transmitted and program identifier information associated with each of the one or more advertisement channels.

12. The method of claim 1, wherein the plurality of different resolutions comprises a standard definition ("SD") resolution and at least one type of a high definition ("HD") resolution.

13. The method of claim 1, embodied as computer-executable instructions on at least one non-transitory computer-readable medium.

14. A method comprising:
maintaining, by an advertisement insertion subsystem, data representative of a plurality of advertisements each having one of a plurality of different resolutions;
detecting, by the advertisement insertion subsystem, a message indicative of an upcoming advertisement break in a media content program being transmitted to a media content access device by way of a content channel;
detecting, by the advertisement insertion subsystem, a resolution of the media content program;
selecting, by the advertisement insertion subsystem, one or more advertisements having the same resolution as the resolution of the media content program from the plurality of advertisements;
directing, by the advertisement insertion subsystem, a dynamic advertisement delivery subsystem communicatively coupled to the media content access device to dynamically transmit the selected one or more advertisements by way of one or more corresponding advertisement channels during the advertisement break;
receiving, by the advertisement insertion subsystem, tuning information corresponding to the one or more advertisement channels from the dynamic advertisement delivery subsystem; and
distributing, by the advertisement insertion subsystem prior to an occurrence of the advertisement break, the tuning information to the media content access device.

15. The method of claim 14, further comprising:
selecting, by the media content access device, an advertisement included in the one or more advertisements for presentation to a user in accordance with a targeted advertisement selection heuristic; and
tuning, by the media content access device, away from the content channel to an advertisement channel included in the one or more advertisement channels that carries the selected advertisement in accordance with the tuning information.

16. The method of claim 14, embodied as computer-executable instructions on at least one non-transitory computer-readable medium.

17. A system comprising:
an advertisement management facility configured to maintain data representative of a plurality of advertisements each having one of a plurality of different resolutions;
a detection facility communicatively coupled to the advertisement management facility and configured to
detect a message indicative of an upcoming advertisement break in a media content program being transmitted to a media content access device by way of a content channel, and
detect a resolution of the media content program;
an interface facility communicatively coupled to the advertisement management facility and configured to direct a dynamic advertisement delivery subsystem communicatively coupled to the media content access device to dynamically transmit a subset of the advertisements by way of one or more advertisement channels, wherein each advertisement included in the subset has resolution as the resolution of the media content program; and
a distribution facility communicatively coupled to the interface facility and configured to distribute tuning information associated with each of the one or more advertisement channels to the media content access device.

18. The system of claim 17, wherein the interface facility is further configured to direct the dynamic advertisement delivery subsystem to begin transmitting the subset of the advertisements by way of the one or more advertisement channels a predetermined amount of time before a beginning of the advertisement break.

19. The system of claim 17, wherein the interface facility is further configured to direct the dynamic advertisement delivery subsystem to cease transmitting the subset of the advertisements upon completion of the advertisement break.

20. A system comprising:
a head-end unit;
an advertisement insertion server communicatively coupled to the head-end unit and configured to maintain data representative of a plurality of advertisements each having one of a plurality of different resolutions; and
a dynamic advertisement delivery server coupled to the advertisement insertion unit;

wherein
the head-end unit is configured to
detect a message indicative of an upcoming advertisement break in a media content program being transmitted to a media content access device by way of a content channel,
detect a resolution of the media content program, and
transmit data representative of the message and the resolution to the advertisement insertion server;
the advertisement insertion server is further configured to
select one or more advertisements having the same resolution as the resolution of the media content program from the plurality of advertisements, and
transmit a request to the dynamic advertisement delivery server to dynamically transmit the selected one or more advertisements by way of one or more advertisement channels; and the dynamic advertisement delivery server is configured to
transmit the one or more advertisements by way of the one or more advertisement channels in response to the request, and
provide the advertisement insertion server with tuning information associated with each of the one or more advertisement channels.

21. The system of 20, wherein:
the advertisement insertion server is further configured to provide the head-end unit with the tuning information received from the dynamic advertisement delivery server; and
the head-end unit is further configured to distribute the tuning information to the media content access device.

* * * * *